(12) United States Patent
Sorkin

(10) Patent No.: US 10,717,159 B2
(45) Date of Patent: Jul. 21, 2020

(54) PLASMA CUTTER FOR POST TENSION PLANT

(71) Applicant: Felix Sorkin, Stafford, TX (US)

(72) Inventor: Felix Sorkin, Stafford, TX (US)

( * ) Notice: Subject to any disclaimer, the term of this patent is extended or adjusted under 35 U.S.C. 154(b) by 318 days.

(21) Appl. No.: 15/785,970

(22) Filed: Oct. 17, 2017

(65) Prior Publication Data

US 2018/0104774 A1 Apr. 19, 2018

Related U.S. Application Data

(60) Provisional application No. 62/409,088, filed on Oct. 17, 2016.

(51) Int. Cl.
*B23K 10/00* (2006.01)
*B23K 37/04* (2006.01)
*B23K 37/02* (2006.01)
*B23K 9/10* (2006.01)
*B23K 101/32* (2006.01)

(52) U.S. Cl.
CPC ............ *B23K 37/04* (2013.01); *B23K 9/1006* (2013.01); *B23K 10/00* (2013.01); *B23K 10/006* (2013.01); *B23K 37/0211* (2013.01); *B23K 37/0241* (2013.01); *B23K 2101/32* (2018.08)

(58) Field of Classification Search
CPC ...... B23K 37/04; B23K 9/1006; B23K 10/00; B23K 37/0211; B23K 37/0241; B23K 2101/32; H05H 1/26
USPC ............ 219/121.39, 121.44, 121.48, 121.59, 219/121.58
See application file for complete search history.

(56) References Cited

U.S. PATENT DOCUMENTS

| 4,896,470 | A | | 1/1990 | Sorkin | |
|---|---|---|---|---|---|
| 5,072,558 | A | | 12/1991 | Sorkin et al. | |
| 5,436,425 | A | * | 7/1995 | Sorkin | B23K 10/00 219/121.39 |
| 5,720,139 | A | | 2/1998 | Sorkin | |
| 5,726,416 | A | * | 3/1998 | Katooka | B23K 10/00 219/121.36 |
| 5,897,102 | A | | 4/1999 | Sorkin | |
| 6,040,546 | A | | 3/2000 | Sorkin | |
| 6,380,508 | B1 | | 4/2002 | Sorkin | |
| 6,393,781 | B1 | | 5/2002 | Sorkin | |
| 6,817,148 | B1 | | 11/2004 | Sorkin | |

(Continued)

OTHER PUBLICATIONS

Readypak; 2 pages https://web.archive.org/web/20150312223933/ https://torchmate.com/readypak (archived web page from Mar. 12, 2015).

(Continued)

*Primary Examiner* — Mark H Paschall
(74) *Attorney, Agent, or Firm* — Adolph Locklar

(57) ABSTRACT

The system includes a plasma strand cutter. The plasma strand cutter includes a plasma torch, the plasma torch including a pivot and an attachment point and an actuating device, the actuating device mounted on the plasma torch at the attachment point. The plasma strand cutter also includes a power supply, the power supply connected to the plasma torch and the actuating device. The system includes a strand puller, the strand puller paired with the plasma strand cutter and a platform, the platform positioned so as to provide a rest for or in close proximity to the strand.

10 Claims, 6 Drawing Sheets

(56) References Cited

U.S. PATENT DOCUMENTS

| | | | |
|---|---|---|---|
| 7,176,404 B2 * | 2/2007 | Herres | B23K 9/323 |
| | | | 219/121.48 |
| 7,596,915 B2 | 10/2009 | Lee et al. | |
| D615,219 S | 5/2010 | Sorkin | |
| 8,069,624 B1 | 12/2011 | Sorkin | |
| 8,251,344 B1 | 8/2012 | Sorkin | |
| 8,946,584 B2 | 2/2015 | Riemann et al. | |
| 9,303,406 B2 | 4/2016 | Sorkin | |
| 9,982,434 B1 * | 5/2018 | Crigler | E04C 5/122 |
| 2003/0052095 A1 | 3/2003 | Sanders et al. | |
| 2008/0023449 A1 * | 1/2008 | Salsich | H05H 1/34 |
| | | | 219/121.44 |
| 2015/0330079 A1 | 11/2015 | Sorkin | |

OTHER PUBLICATIONS

Conventional Air Plasma Cutters; 2 pages; https://web.archive.org/web/20151016235254/https://torchmate.com/plasma-cutters-air (archived web page from Oct. 16, 2015).

Type 80 Pilot Arc Machine Torch 8 Metre; 2 pages; https://weldingstore.tokentools.com.au/p80p-pilot-arc-cnc-machine-pencil-torch.

Extended European Search Report issued in EP17196799.5, dated Apr. 25, 2018 (8 pages).

* cited by examiner

PLASMA CUTTER FOR POST TENSION PLANT

CROSS REFERENCE TO RELATED APPLICATIONS

This application is a nonprovisional application which claims priority from U.S. provisional application No. 62/409,088, filed Oct. 17, 2016, the entirety of which is hereby incorporated by reference.

TECHNICAL FIELD/FIELD OF THE DISCLOSURE

The present disclosure relates generally to post-tension anchorage systems. More particularly, the present disclosure relates to plasma cutters for post tension plants.

BACKGROUND OF THE DISCLOSURE

Many structures are built using concrete, including, for instance, buildings, parking structures, apartments, condominiums, hotels, mixed-use structures, casinos, hospitals, medical buildings, government buildings, research/academic institutions, industrial buildings, malls, bridges, pavement, tanks, reservoirs, silos, foundations, sports courts, and other structures.

Prestressed concrete is structural concrete in which internal stresses are introduced to reduce potential tensile stresses in the concrete resulting from applied loads; prestressing may be accomplished by post-tensioned prestressing. In post-tensioned prestressing, a tension member is tensioned after the concrete has attained a specified strength by use of a post-tensioning tendon. The post-tensioning tendon may include anchors, the tension member, and sheaths or ducts. A tension member is conventionally constructed of a material having sufficient tensile strength that can also be elongated. Tension members are often formed from a metal or composite material, such as steel. The post-tensioning tendon conventionally includes an anchorage at each end. The tension member is fixedly coupled to a fixed anchorage positioned at one end of the post-tensioning tendon, the so-called "fixed-end", and stressed at the other anchor, the "stressing-end" of the post-tensioning tendon.

The concrete may be poured into a concrete form. The concrete form may be a form or mold into which concrete is poured or otherwise introduced to give shape to the concrete as it sets or hardens thus forming the concrete member.

Concrete members may be formed in-situ, i.e., as part of the structure to which the concrete members are to become a part, or may be formed ex-situ and transported to the structure and placed therein. When formed ex-situ, the concrete members may be formed as concrete segments at a post tension plant (PT plant). For instance, the post-tensioning tendon may be positioned within the concrete form, the concrete poured, and the concrete member then stressed to form a concrete segment. After the concrete member is stressed, the tension member extends beyond the edge of the concrete segment. Conventionally, at least a portion of the tension member that extends beyond the edge of the concrete member is removed by cutting.

Traditional methods of cutting the tension member at a PT plant include using an abrasive saw or an arm with a sharp edge that cuts the cable. Both the sharp edge and the saw may leave the cut end of the tension member frayed. Use of the abrasive saw also tends to produce dust. Cutting the tension member using traditional methods may take 20-25 seconds or longer.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

SUMMARY

Figure 1:
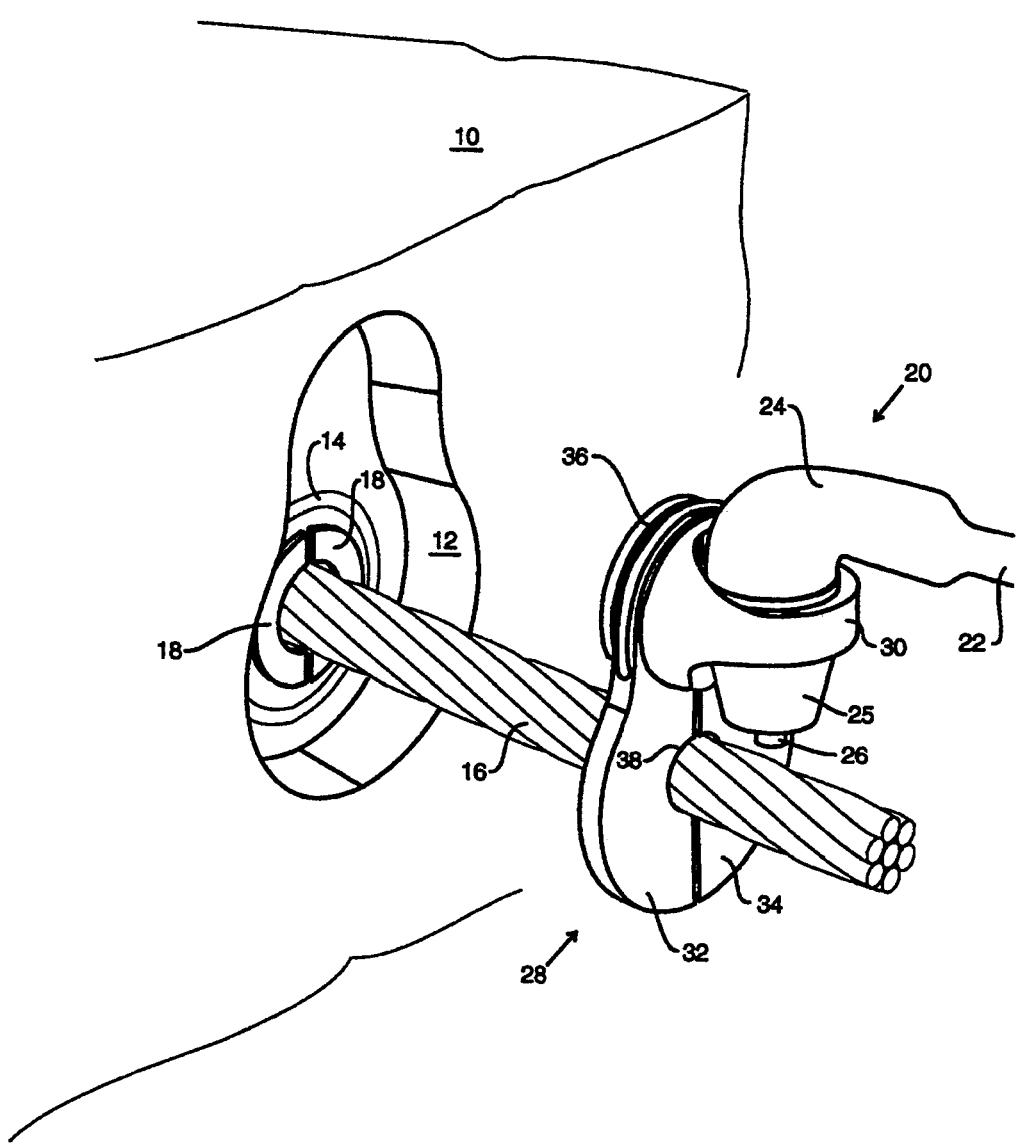
FIG. 1 is a perspective view of a concrete structure with a plasma cutting torch attached to a tension member consistent with certain embodiments of the present disclosure.

A system for cutting a strand in a PT plant is disclosed. The system includes a plasma strand cutter. The plasma strand cutter includes a plasma torch, the plasma torch including a pivot and an attachment point and an actuating device, the actuating device mounted on the plasma torch at the attachment point. The plasma strand cutter also includes a power supply, the power supply connected to the plasma torch and the actuating device. The system includes a strand puller, the strand puller paired with the plasma strand cutter and a platform, the platform positioned so as to provide a rest for or in close proximity to the strand.

A method of cutting a strand at a PT plant is disclosed. The method includes providing a system for cutting a strand in a PT plant. The system includes a plasma strand cutter. The plasma strand cutter includes a plasma torch, the plasma torch including a pivot and an attachment point and an actuating device, the actuating device mounted on the plasma torch at the attachment point. The plasma strand cutter also includes a power supply, the power supply connected to the plasma torch and the actuating device. The system includes a strand puller, the strand puller paired with the plasma strand cutter and a platform, the platform positioned so as to provide a rest for or in close proximity to the strand. The method also includes advancing the strand to the platform and positioning the strand. In addition, the method includes powering the plasma torch, extending a plasma flame from the plasma torch, and rotating the plasma torch about the pivot. Also, the method includes severing the strand using the plasma flame.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts concrete segment 10 including recess 12 is formed in the end of concrete segment 10. Post-tensioning anchor 14 may be positioned about tension member 16. Tension member 16 may extend through recess 12 from end of concrete segment 10. Tension member 16 may be held in place by wedges 18 seated within anchor 14.

Plasma cutting torch 20 may be used for cutting tension member 16. In certain embodiments, plasma cutting torch 20 may use a gas source, such as a source of air, nitrogen, argon or oxygen, to an electrical power source and electrodes to generate a stream of air, nitrogen or other gaseous plasma at temperatures sufficient to cut tension member 16, for example and without limitation, from about 3,000° C.-5,000° C. or more. In some embodiments, the plasma torch will cut through tension member 16 more quickly than an acetylene torch, abrasive saw, or metal arm.

Plasma cutting torch 20 may include handle 22, head 24, and cutting tip 26. Heat shield 25 may surround at least a portion of cutting tip 26. Heat shield 25 may be formed of, for example, ceramic. Plasma cutting torch 20 may also include a compressor, cylinder or other source for the gas to be formed into the plasma, a source of electrical power and an electrode for converting the gas into a gaseous plasma. The electrode may be disposed in handle 22, head 24, or in another portion of plasma cutting torch 20. In certain embodiments, plasma cutting torch 20 may have an electrical ground. The electrical ground may include, but not be limited to a metal or other conductive hand that touches tension member 16. In other embodiments, the ground may be a clamp 28, as described hereinbelow. A superheated stream of gaseous plasma is discharged from cutting tip 26. During cutting, cutting tip 26 is positioned near tension member 16. Spacing between cutting tip 26 and the surface of tension member 16 may vary.

Figure 2:
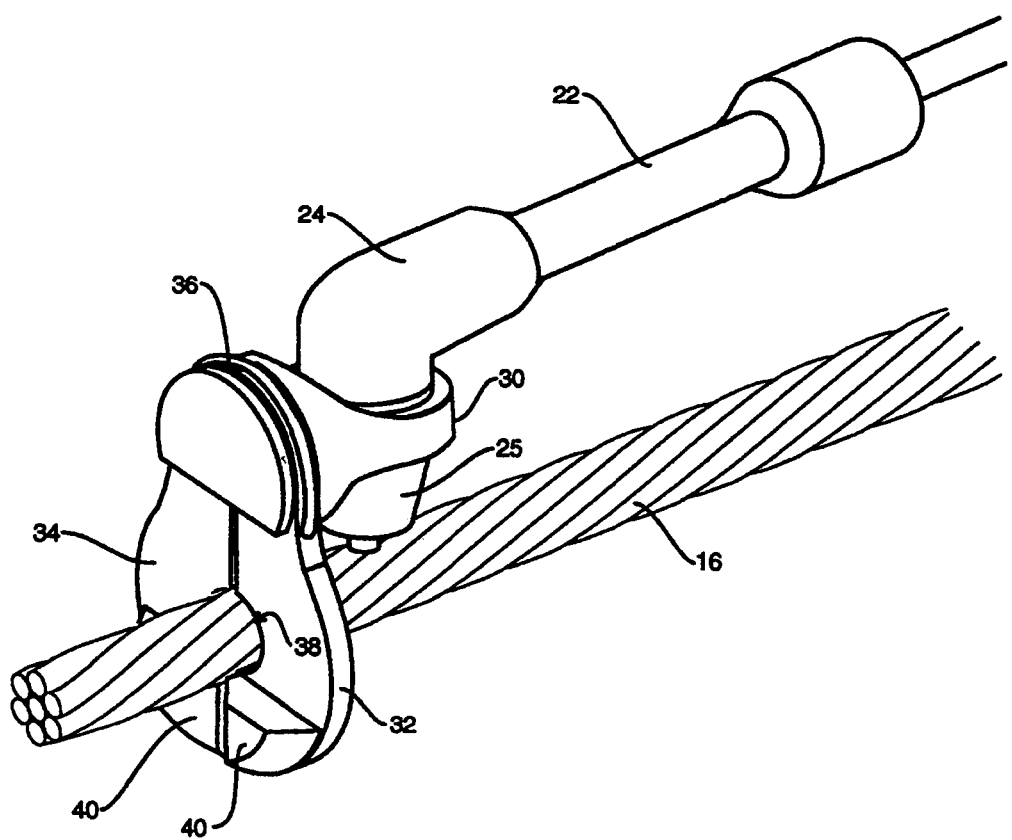
FIG. 2 is a detailed view, in perspective, of the plasma cutting torch head and attachment of FIG. 1 consistent with certain embodiments of the present disclosure

Plasma cutting torch 20 may have a limited cutting depth. In some embodiments, cutting of tension member 16 by plasma cutting torch 20 may be performed within recess 12 in close proximity to the anchor 14. In certain embodiments, as shown in FIGS. 1 and 2, plasma cutting torch 20 may be mounted on clamp 28 for positioning cutting tip 26 with respect to tension member 16 and anchor 14. While shown in FIGS. 1 and 2 as having a particular configuration, clamp 28 may be of any configuration for positioning cutting tip 26 within sufficient distance of tension member 16 to cut tension member 16 and within a desired distance of anchor 14.

Clamp 28 may be releasably coupled to tension member 16, such as through bracket 30. Bracket 30 may be mechanically coupled to head 24 of plasma cutting torch 20. Bracket 30 may be sized to be friction fitted around head 24 or may be permanently attached to head 24 or heat shield 25. In some embodiments, positioners may be attached to bracket 30 so as to position cutting tip 26 at a predetermined distance from anchor 14 along the longitudinal axis of tension member 16. In certain embodiments, the positioners may be pair of depending jaws 32, 34. Pair of depending jaws 32, 34 may be pivotally attached to bracket 30 and biased towards a closed position by a biasing mechanism, such as spring clip 36. Each of depending jaws 32, 34 may include semicircular relieved portion 38 at the inner edge of each of depending jaws 32, 34. When pair of depending jaws 32, 34 abut, semicircular relieved portions 38 may form a circular opening through which the tension member 16 may be received. As shown in FIG. 2, the bottom portion of each depending jaw 32, 34 may have sloping area 40. Sloping area 40 may bias depending jaws 32, 34 open when the depending jaws 32, 34 are pushed against tension member 16. Once the tension member 16 is received within the circular opening, depending jaws 32, 34 may close around tension member 16.

Depending jaws 32, 34, when closed around the tension member 16 may act as shield means for protecting anchor 14 and wedges 18 from hot metal splatter during a cutting operation using plasma cutting torch 20. In certain embodiments, depending jaws 32, 34 may be shaped to conform to the shape of recess 12.

When plasma cutting torch 20 is to be used, depending jaws 32, 34 may be positioned around the tension member 16, outside recess 12. Depending jaws 32, 34 may be biased into a closed position by spring clip 36. Depending jaws 32, 34 with head 24 attached pivotally thereto by the bracket 30, may be moved longitudinally along tension member 16 until depending jaws 32, 34 are received within recess 12. Cutting tip 26 may then be positioned both angularly and longitudinally about tension member 16 and anchor 14 for cutting the tension member 16.

In certain embodiments, tension member 16 may be encased by a sheath. As depicted in FIG. 1, the sheath has been removed prior to placement of clamp 28. In other embodiments, clamp 28 may be placed over the sheath.

Because depending jaws 32, 34 and mounting bracket 30 are pivotally connected, during the cutting operation, cutting tip 26 may be moved through an arc substantially perpendicular to the longitudinal axis of tension member 16. By moving cutting tip 26 through the arc substantially perpendicular to the longitudinal axis of tension member 16, the plasma stream may cut through the entire thickness of tension member 16. Where a tension member 16 is encased by a sheath, the sheath may be melted by the plasma stream. After cutting, the severed end of tension member 16, plasma cutting torch 20 and clamp 28 may then be removed.

In certain embodiments, recess 12 may be asymmetrically shaped to permit pivoting of plasma cutting torch 20 attached to the clamp, so that the plasma stream may be rotated through an arc for cutting tension member 16, while the clamp 28 remains within recess 12. The asymmetrically-shaped recess 12 may include an upper portion for receiving head 24, and a lower portion for permitting rotation of cutting tip 26 through an area of approximately 90° (about 45° on each side of the longitudinal axis of tension member 16). An asymmetric shape of recess 12 may allow a recess of smaller area than a symmetric-shape recess 12, thereby requiring less grout for subsequent filling and sealing of recess 12. In an alternative embodiment, the plasma cutting torch 20 may be rotated about the tension member 16. In the alternative embodiment, recess 12 may be made substantially larger, as rotation of a larger arc with head 24 of plasma cutting torch 20 may be required.

Figure 3:
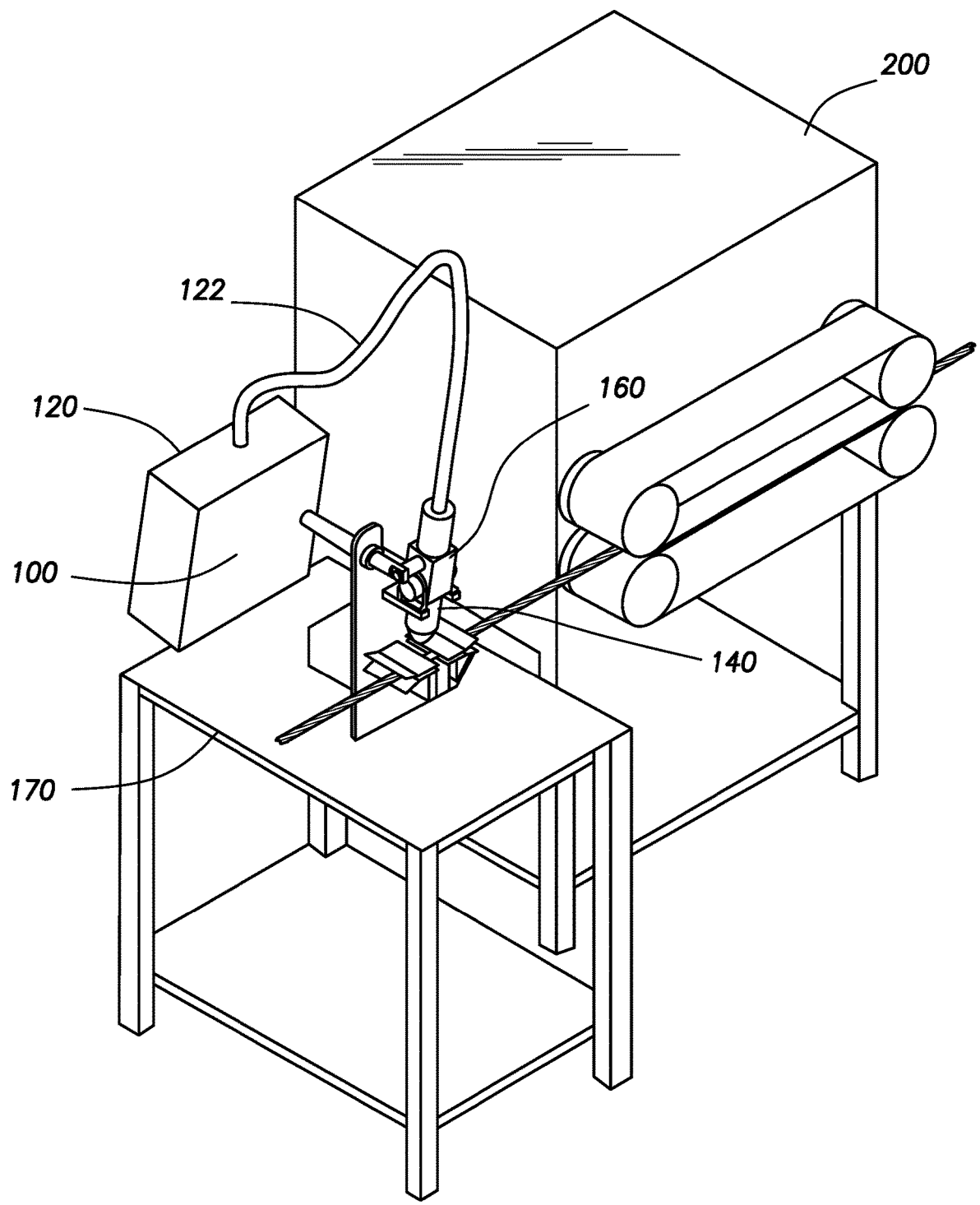
FIG. 3 is a schematic of a PT plant plasma strand cutter consistent with at least one embodiment of the present disclosure.

FIG. 3 is a schematic of PT plant plasma strand cutter 100 consistent with at least one embodiment of the present disclosure. PT plasma strand cutter includes power source 120, actuating device 140, and plasma torch 160.

Power source 120 may supply the gas to be formed into the plasma, and a source of electrical power for converting the gas into a gaseous plasma. In addition, power source 120 may supply either hydraulic power or electrical power to actuate actuating device 140. Electrical power and/or the gas to be formed into plasma may be delivered to plasma torch 160 through umbilical 122. Actuating device 140 may be, for example and without limitation, a piston or a linear actuator. Thus, power source 120 may supply hydraulic power or electromechanical power to actuating device 140.

As shown in FIG. 3, power source 120 may be mounted on platform 170. As also shown in FIG. 3, PT plasma strand cutter 100 may be paired with strand puller 200. Plasma torch 160 may be a plasma pencil torch.

Figure 4:
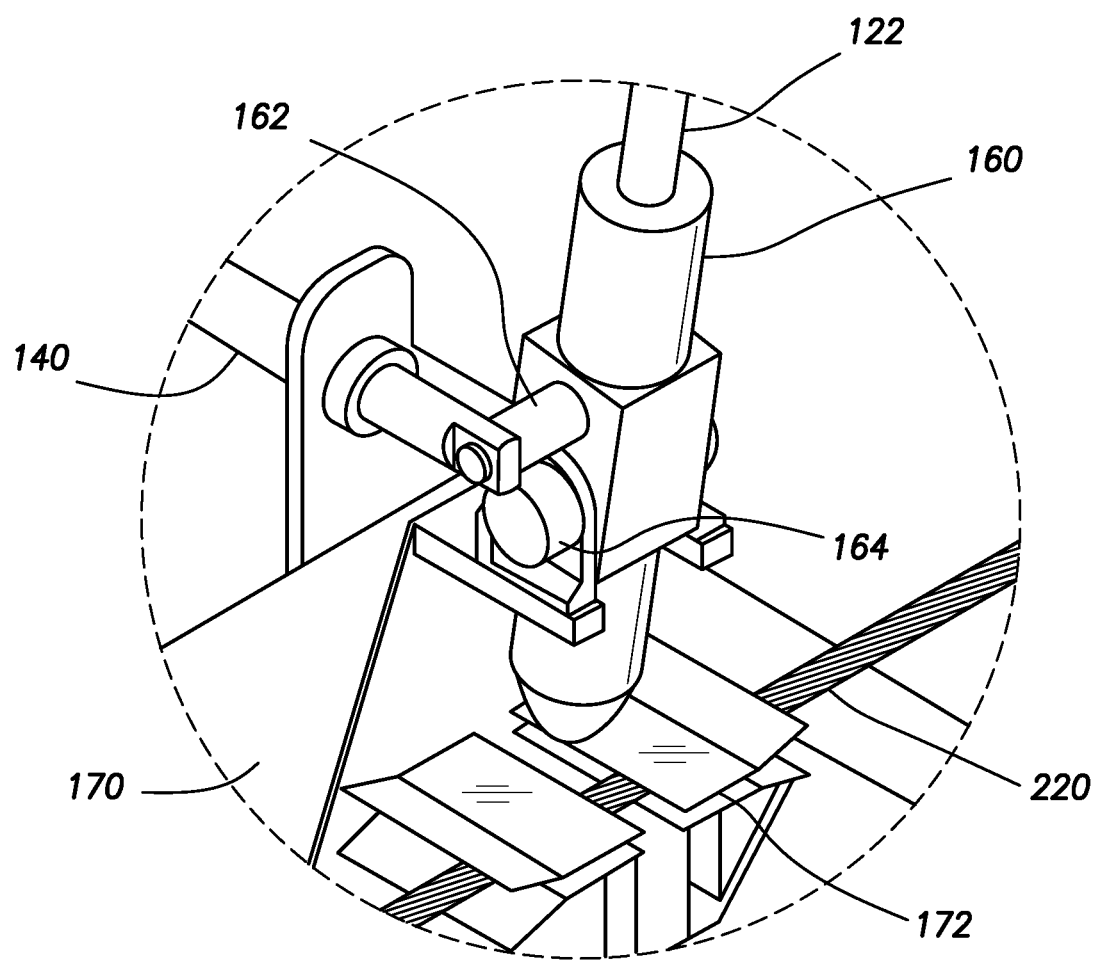
FIG. 4 is a view of a PT plant plasma strand cutter focused on the plasma torch consistent with at least one embodiment of the present disclosure.

FIG. 4 is a view of PT plant plasma strand cutter 100 focused on plasma torch 160. As shown in FIG. 4, plasma torch 160 includes attachment point 162 on which actuating device 140 is mounted. While shown as a cylinder extending from plasma torch 160, attachment point may be any device upon which actuating device 140 may be mounted. FIG. 4 further depicts pivot 164. Pivot 164 of plasma torch 160 may be adapted to allow rotation of plasma torch 160 as described hereinbelow.

FIG. 4 also depicts strand 220 positioned to be cut by plasma torch 160. As shown in FIG. 4, strand 220 may rest or be in proximity to platform 170. As further shown in FIG. 4, platform 170 may include guide 172 to assist an operator in placement of strand 220 and to guide rotation of plasma torch 160.

Figure 5:
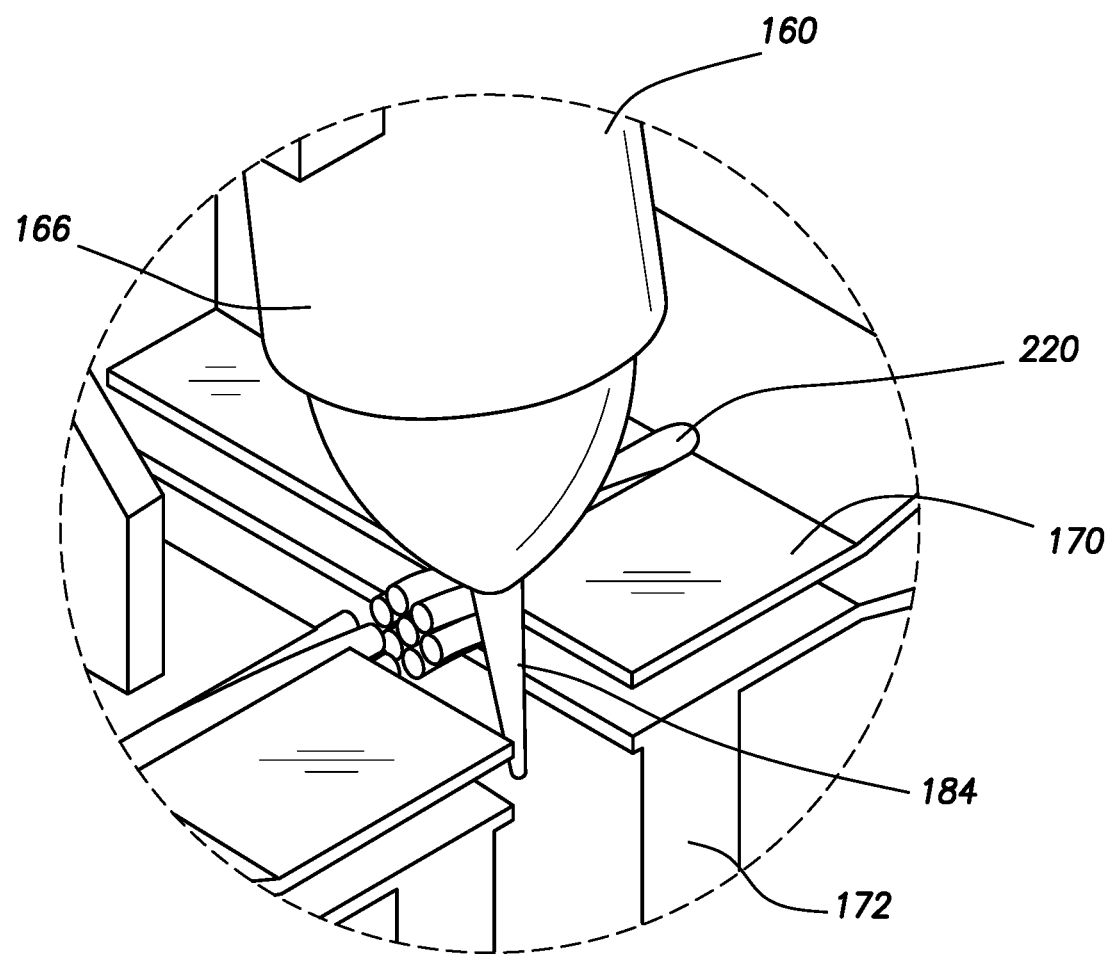
FIG. 5 is a schematic view of the tip of the plasma torch while in operation consistent with at least one embodiment of the present disclosure.
Figure 6:
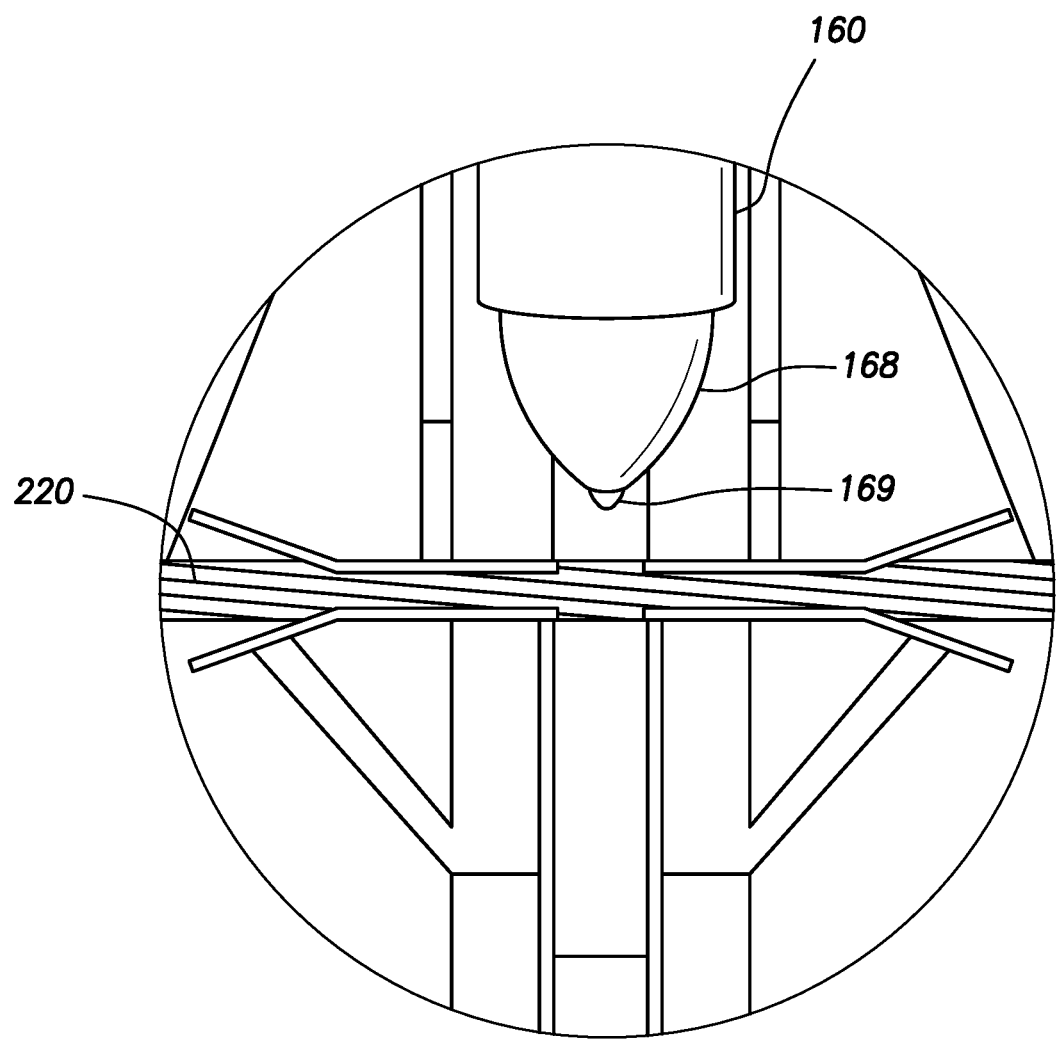
FIG. 6 is a schematic view of the tip of the plasma torch consistent with at least one embodiment of the present disclosure.

FIG. 5 is a schematic view of tip 166 of plasma torch 160 while in operation, depicting plasma flame 184 having cut strand 220. FIG. 5 further depicts torch cap 168. FIG. 6 is a schematic view of tip 166 of plasma torch 160. As shown in FIG. 6, torch cap 168 terminates in electrode 169.

During operation, strand puller 200 advances strand 220 to platform 170. Strand 220 is positioned by the operator using guide 172. Plasma torch 160 may be powered, extending plasma flame 184 from tip 166 of plasma torch 160. Plasma torch 160 may be rotated above pivot 164 using actuating device 140, thereby severing strand 220.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A system for cutting a strand in a PT plant comprising:
    a plasma strand cutter, the plasma strand cutter including:
        a plasma torch, the plasma torch including a pivot and an attachment point, the plasma torch positionable so as to cut the strand;
        an actuating device, the actuating device mounted on the plasma torch at the attachment point;
        a power supply, the power supply connected to the plasma torch and the actuating device;
        a platform supporting the power supply; and
    a strand puller, the strand puller positioned to engage the strand and advance the strand to the platform;
    wherein the platform includes a guide that guides placement of the strand and guides rotation of the plasma torch.

2. The system of claim 1, wherein the power supply is adapted to supply gas and electrical power to the plasma torch.

3. The system of claim 2, wherein the power supply is connected to the plasma strand cutter via an umbilical.

4. The system of claim 1, wherein the actuating device is a piston or linear actuator.

5. The system of claim 1, wherein the pivot is adapted to allow rotation of plasma torch 160.

6. The system of claim 1, wherein the plasma torch includes a torch cap.

7. The system of claim 6, wherein the plasma torch cap terminates in an electrode.

8. A method of cutting a strand at a PT plant comprising:
    providing a system for cutting a strand in a PT plant comprising:
        a plasma strand cutter, the plasma strand cutter including:
            a plasma torch, the plasma torch including a pivot and an attachment point;
            an actuating device, the actuating device mounted on the plasma torch at the attachment point;
            a power supply, the power supply connected to the plasma torch and the actuating device;
            a platform supporting the power supply; and
            a strand puller, the strand puller positioned so as to advance the strand and advance the strand to the platform; and
    advancing the strand to the platform;
    positioning the strand;
    powering the plasma torch;
    extending a plasma flame from the plasma torch;
    rotating the plasma torch about the pivot; and
    severing the strand using the plasma flame.

9. The method of claim 8, wherein the step of rotating the plasma torch is performed by an actuating device.

10. The method of claim 8 wherein the platform includes a guide, and wherein the guide guides rotation of the plasma torch.

* * * * *